(12) United States Patent
Bursik et al.

(10) Patent No.: US 11,698,938 B2
(45) Date of Patent: Jul. 11, 2023

(54) SYSTEM AND METHOD FOR DATA EVENT MANAGEMENT SYSTEM

(71) Applicant: Target Brands, Inc., Minneapolis, MN (US)

(72) Inventors: Jeffrey Jacob Bursik, Farmington, MN (US); Robert James Koste, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 248 days.

(21) Appl. No.: 16/663,153

(22) Filed: Oct. 24, 2019

(65) Prior Publication Data
US 2021/0124786 A1    Apr. 29, 2021

(51) Int. Cl.
*G06F 16/953*    (2019.01)
*G06F 16/9538*    (2019.01)

(52) U.S. Cl.
CPC ........ *G06F 16/953* (2019.01); *G06F 16/9538* (2019.01)

(58) Field of Classification Search
CPC .......................... G06F 16/953; G06F 16/9538
USPC ....................................................... 707/755
See application file for complete search history.

(56) References Cited

U.S. PATENT DOCUMENTS

| 6,546,381 B1* | 4/2003 | Subramanian | G06F 16/24542 |
| 7,139,749 B2* | 11/2006 | Bossman | G06F 16/217 |
| | | | 707/999.005 |
| 7,448,022 B1* | 11/2008 | Ram | G06F 9/45504 |
| | | | 717/120 |
| 2004/0083204 A1* | 4/2004 | Dettinger | G06F 16/90335 |
| | | | 707/E17.14 |
| 2006/0143034 A1* | 6/2006 | Rothermel | G06Q 10/10 |
| | | | 705/301 |
| 2008/0288446 A1* | 11/2008 | Hu | G06F 16/2462 |
| 2009/0018996 A1* | 1/2009 | Hunt | G06Q 30/02 |
| 2009/0077016 A1* | 3/2009 | Belknap | G06F 16/2462 |
| 2010/0198807 A1* | 8/2010 | Kuno | G06F 16/24542 |
| | | | 707/E17.017 |
| 2013/0332487 A1* | 12/2013 | Ramesh | G06F 16/2455 |
| | | | 707/775 |
| 2014/0094159 A1* | 4/2014 | Raleigh | H04W 24/02 |
| | | | 455/418 |
| 2014/0129582 A1* | 5/2014 | Ramsay | G06F 16/242 |
| | | | 707/E17.014 |

(Continued)

OTHER PUBLICATIONS

Paul White; Rewriting Queries to Improve Performance; https://sqlperformance.com/2014/09/sql-plan/rewriting-queries-improve-performance; 8 Pages; Dated: Sep. 3, 2014.

(Continued)

*Primary Examiner* — Mark E Hershley
(74) *Attorney, Agent, or Firm* — Merchant & Gould P.C.

(57) ABSTRACT

Generally, the present disclosure relates to solving issues with inefficient management of data within an organization by building a central repository of events within the data ecosystem. The data event management system, disclosed herein, offers a platform agnostic ledger of the data ecosystem that enables data transparency and identifies patterns/bottlenecks to properly adjust to meeting the needs of the data consumer. With this information, data driven decisions can be made to prioritize workload and ensure funding is supporting the consumer prioritized assets.

17 Claims, 6 Drawing Sheets

(56) References Cited

U.S. PATENT DOCUMENTS

| | | | | |
|---|---|---|---|---|
| 2016/0292236 A1* | 10/2016 | Joshi | ................... | G06F 16/1805 |
| 2016/0335306 A1* | 11/2016 | Teodorescu | ......... | G06F 16/2456 |
| 2017/0118092 A1* | 4/2017 | Dixon | .................... | H04L 43/04 |
| 2019/0095491 A1* | 3/2019 | Bhattacharjee | ..... | G06F 16/2379 |
| 2019/0243836 A1* | 8/2019 | Nanda | ............... | G06F 16/24568 |
| 2019/0258636 A1* | 8/2019 | Bhattacharjee | ... | G06F 16/24549 |
| 2020/0034468 A1* | 1/2020 | Lei | .................... | G06F 16/24568 |
| 2020/0050612 A1* | 2/2020 | Bhattacharjee | ..... | G06F 16/2471 |
| 2020/0065303 A1* | 2/2020 | Bhattacharjee | ....... | G06F 16/278 |
| 2020/0104401 A1* | 4/2020 | Burnett | ................. | G06F 16/287 |
| 2020/0104402 A1* | 4/2020 | Burnett | ............... | G06F 16/2477 |
| 2020/0279173 A1* | 9/2020 | Gupta | ................. | H04L 41/5022 |
| 2020/0367129 A1* | 11/2020 | Raheem | ............ | H04W 28/0268 |
| 2021/0117425 A1* | 4/2021 | Rao | .................... | H04L 67/1031 |

OTHER PUBLICATIONS

Techniques for Improving the Performance of SQL Queries Under Workspaces in the Data Service Layer; https://www.ibm.com/support/knowledgecenter/en/SSZLC2_7.0.0/com.ibm.commerce.developer.soa.doc/refs/rsdperformanceworkspaces.htm; 12 Pages; Dated: Apr. 18, 2019.

* cited by examiner

SYSTEM AND METHOD FOR DATA EVENT MANAGEMENT SYSTEM

BACKGROUND

Data management is an important aspect of any organization that handles large volumes of data. Without transparency into the data driven actions within the data ecosystem, the overall insight into the data ecosystem is limited and results in bottlenecks, data replication, data explosion, and data quality issues and inefficient data flow.

Such transparency into data driven actions may be more difficult to attain when those actions are performed across an entire enterprise, which may include many heterogeneous data sources that are accessed in different ways. Accordingly, it can be difficult to determine ways in which data driven actions may be improved when such actions implicate more than one type of data source.

SUMMARY

Generally, the present disclosure relates to a system and method for data event management. For example, a data portal may be used to monitor data access events, and those data access events may be assessed to determine ways in which data access is may be improved from a performance perspective. Recommendations for improvement of performance may be provided to, for example, data administrators or users.

In one example aspect, a method for managing data events is disclosed. The method includes: receiving a data event at a data portal, wherein the data event is an event associated with data that is located in one or more data stores from among a plurality of heterogeneous data stores of a data ecosystem; and wherein the data portal includes a user application accessible interface with which user applications can interact to access the heterogeneous data stores, and to access information about the heterogeneous data stores without accessing underlying data of the heterogeneous data stores; processing the data event at the data portal; ingesting the data event into a pipeline service for additional processing; logging the data event via a pipeline service in a data event log; managing execution, via the pipeline service, of a plurality of analyses associated with the data event, the plurality of analyses each generating at least one of usage or timeliness data for the data event; and transmitting a result of the analyses to at least one application external to the data portal, the result including a trend analysis of data events and a recommendation regarding restructuring of at least one of (a) a query or (b) one of the heterogeneous data stores.

In a second aspect, a system for managing data events is disclosed. The system includes: a data portal that receives a data event; wherein the data event is an event associated with data that is located in one or more data stores from among a plurality of heterogeneous data stores of an enterprise; and wherein the data portal is user application accessible interface with which users can interact to access the heterogeneous data stores, and to access information about the heterogeneous data stores without accessing underlying data of the heterogeneous data stores; an event pipeline service that conducts additional processing on the data event, wherein the additional processing includes: logging the data event via a pipeline service in a data event log; managing execution, via the pipeline service, of a plurality of analyses associated with the data event, the plurality of analyses each generating at least one of usage or timeliness data for the data event; and transmitting a result of the analyses to at least one application external to the data portal, the result including a trend analysis of data events and a recommendation regarding restructuring of at least one of (a) a query or (b) one of the heterogeneous data stores.

In a third aspect, another method for managing data events is disclosed. The method includes: receiving a data event associated with a read action query at a data portal, wherein the data event is an event associated with data that is located in one or more data stores from among a plurality of heterogeneous data stores of a data ecosystem; and wherein the data portal is a user application accessible interface with which users can interact to access the heterogeneous data stores, and to access information about the heterogeneous data stores without accessing underlying data of the heterogeneous data stores; processing the data event at the data portal; ingesting the data event into a pipeline service for additional processing; logging the data event via a pipeline service in a data event log; managing execution, via the pipeline service, of a plurality of analyses associated with the data event, wherein, the plurality of analyses are each implemented using an independent micro-services architecture; and the plurality of analyses includes: a common data join analysis that comprises: parsing the read action query; analyzing data stores associated with the read action query for usage data; and based on the analysis, generating a recommendation to join one or more data sets distributed across one or more data stores to improve performance of the read action query; and transmitting the recommendation to at least one application external to the data portal.

DETAILED DESCRIPTION

Generally, the present disclosure relates to a data event management system that solves issues with inefficient management of data within an organization. The data event management system builds a central repository of data events within the data ecosystem, which enables platform agnostic data ingestion and discoverability throughout the ecosystem.

Organizations today have to manage large volumes of data. Data management systems may be configured to store data in a data ecosystem that uses a plurality of data stores built on different platforms. A data event is an action or occurrence generated by the user that is associated with data located in one or more of the data stores in the data ecosystem. The data event management system is utilized to capture and store data events in categories and subcategories for the flexibility of platform agnostic ingestion. Data events are also stored and digested through several services to understand trends and inefficiencies, and to enable alerting and various other defined actions. An overall architecture is built leveraging cloud-based micro-services. This provides the ability to scale to meet business needs and adjust over time to a rapidly growing data ecosystem.

In accordance with example embodiments, the data event management system features two main high-level categories of information extracted from data events in any data ecosystem—usage and timeliness. Data events focused on read transactions being conducted with the data from the data stores are broken out into the usage category. Data events focused on create, update, or delete transactions being conducted with the data from the data stores are broken out into the timeliness category. The high-level usage and timeliness categories are further broken down into sub-categories. For example, timeliness is broken down into sub-categories of: movement timeliness and data throughput. Each event category has a defined model to ensure platforms store data in a similar format, which enables all technology to ingest to the centralized repository and simplifies the trend analysis and discoverability post-ingestion.

In accordance with example embodiments of the present disclosure, in some instances usage and timeliness information derived from data events may be utilized to identify ways in which responsiveness to data events may be improved. For example, analysis of logged data events may lead to a recommendation that a data query be reformulated to access data from fewer data sources (and therefore reduce latency and computational complexity) or that an underlying data structure be reconfigured to accommodate commonly performed queries that would otherwise experience poor performance.

Figure 1:
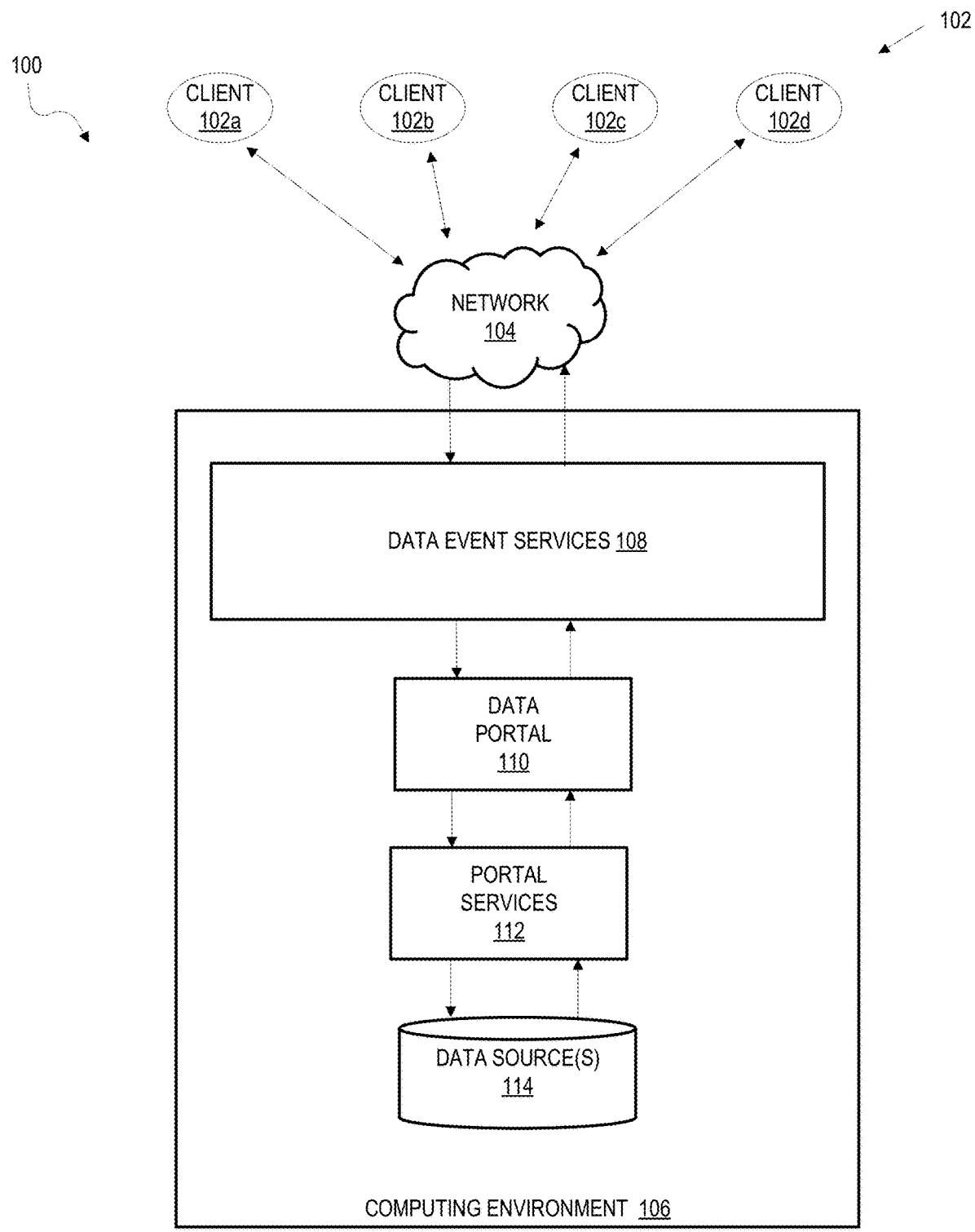
FIG. 1 illustrates an example data event management system in which aspects of the present disclosure may be implemented.

FIG. 1 illustrates an example data event management system 100. The system 100 includes a plurality of clients 102 (102a, 102b, 102c, 1022d) connected over a network 104 to a computing environment 106 that provides data event services 108 and a data portal 110. The computing environment 106 further includes data portal services 112 that facilitate processing queries received by the data portal 110, obtaining data for the data portal 110, and processing data, among other services. The portal services 112 can be connected to one or more data sources 114. The data sources 114 may be stored locally on the computing environment 106 or connected to the computing environment 106 over the network 104. Details regarding the data portal 110, portal service 112 and data source(s) 114 are further described in the application U.S. Ser. No. 15/679,878, which is herein incorporated by reference in its entirety for any and all purposes.

The plurality of client devices 102 may be include any device suitable for accessing the data portal 108. For example, where the data portal 108 is a website, the client device 102 can be any suitable computing device for accessing the website. Where the data portal 108 is a locally-installed application, the user device 102 can be any suitable computing device for executing a locally-installed application.

The network 104 is an electronic communication medium that facilitates communication between multiple different devices (e.g., client devices 102 and computing environment 106 as illustrated in FIG. 1). The network 104 can include links between multiple computing devices and can include a variety of different kinds of hardware (e.g., routers, hubs, servers, etc.) or software to connect the devices. The network 104 can vary in scope and configuration. In some examples, the network 104 is a local area network, a wide area network (e.g. the Internet), or an intranet, among others.

The computing environment 106 can be any computing environment suitable for providing data event services 108. In many embodiments, the computing environment may be a server or a virtual machine running on a server, but other implementations may also be used. An example of an architecture of a computing environment 106 is provided in FIG. 6.

The data event services 108 offers a ledger of the data ecosystem regardless of platform or technology which enables data transparency and identifies patterns/bottlenecks to properly adjust to meet the data consumer needs. The data event services 108 catalogs all data related events that are transmitted to and received from the data portal. Data events include any data related actions including actions focused on read, create, update or delete transactions being conducted with the data. The data event services 108 is described in further detail as related to FIG. 2.

Figure 2:
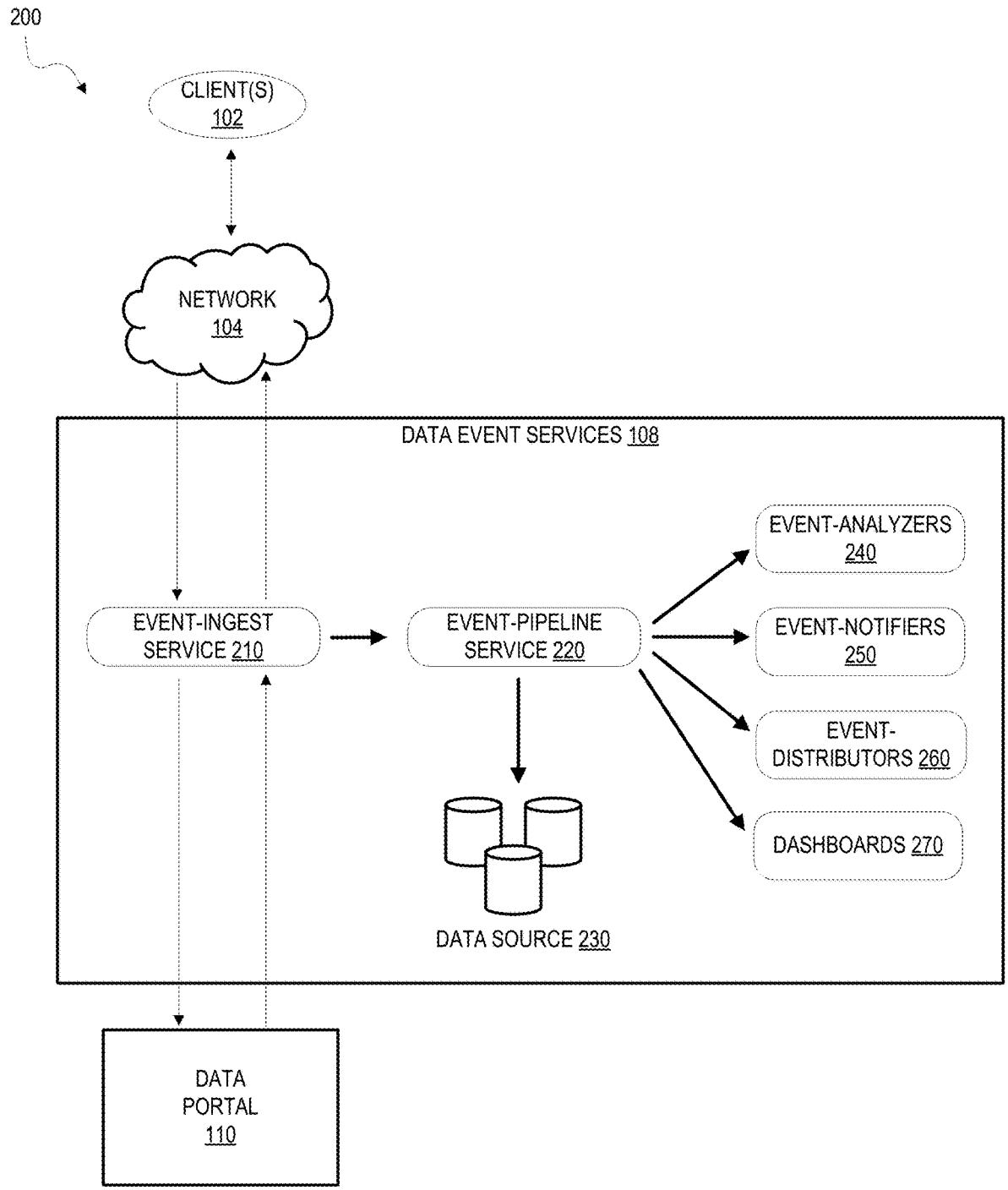
FIG. 2 illustrates another example data event management system implementing aspects of the present disclosure.

FIG. 2 illustrates an example data event management system 200 that includes data event services 108. In addition to the data event services 108, the data event management system 200 also includes a plurality of clients 102, a network 104 and a data portal 110 as described in relation to FIG. 1. The data event services 108 architecture may include a plurality of dependent service categories, such as: event ingest service 210, event pipeline service 220, analyzer services, notifier services and distributor services.

The event ingest service 210 ingests data events, transmitted and received to and from the data portal 110, into the event pipeline service 220. The data ingestion is a representational state transfer (REST) interface that accepts any data event domain model and pushes the data to the event pipeline service 220 for additional processing. The event ingest service 210 is responsible for receiving events and translating them into the event domains for downstream dependencies. The purpose of this service is to separate the workload of the ingestion and downstream processing of data as the scalability would be negatively impacted as the data ecosystem grows in size.

The event pipeline service 220 is a series of chains that is responsible for ensuring that all events are saved in data source 230 before distributing the event, in an immutable state, to various micro-services for additional processing within the data ecosystem. The data source 230 may be a centralized repository. Saving the data event in a centralized repository ensures that there are checks and balances and that all dependencies of the event have a single point of reference if a failure/error were to occur. In addition, by saving the data event in a data store 230, the additional processing of data event that is done by the data event services does not impact latency of the data event as it is processed in the data portal. After saving the data even in the data store 230, the event pipeline service 220 distributes the data event to one or more of a plurality of services including the event analyzers 240, event notifiers 250, event distributors 260, or dashboards 270.

The one or more event analyzers 240 are responsible for conducting business or product defined analysis on the events. The plurality of analyzers 240 each focus on analyzing different performance metrics associated with the data events. The event analyzers 240 are described in further detail as related to FIG. 4.

The one or more event notifiers 250 are responsible for communicating information regarding the data event action to the user via applications such as email, slack, instant messaging, etc. The information that is communicated to the user may include one or more of the following: status, event analysis report, recommendations for improving data event performance, etc. The event notifiers 250 are described in further detail as related to FIG. 4.

The one or more event distributors 260 are responsible for distributing events to downstream applications to build data driven dependencies. The event distributors 260 allow one or more applications to listen to the data events as they are processed through the event chains. The event distributors 260 are described in further detail as related to FIG. 4.

The one or more dashboards 270 are responsible for displaying information regarding the data event, including status, event analysis report, recommendations for improving data event performance, etc. Each dashboard 270 may display information focused on one of the performance metrics. For example, one dashboard 270 may display information related to usage, while another dashboard 270 may display information related to timeliness. The dashboards 270 are described in further detail as related to FIG. 4 and FIG.5.

Figure 3:
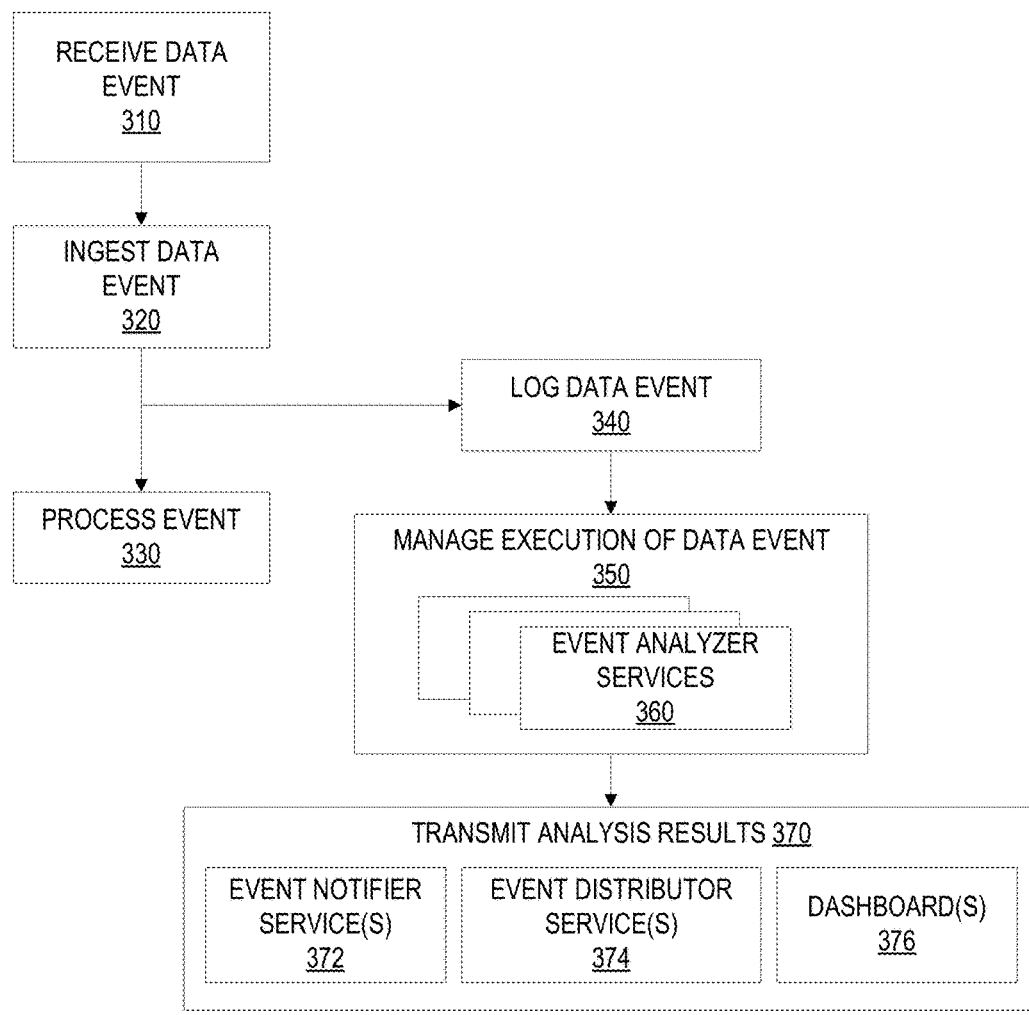
FIG. 3 illustrates an example data event management process, according to an example embodiment.

FIG. 3 illustrates an example data event management process 300. The data event management process 300 starts when the system receives a data event 310. The data event management system then ingests the data event 320 into the pipeline service. Independent of the ingest service, the data event is also transmitted to the data portal, where the data portal processes the event 330. After entering the pipeline, the pipeline service logs the data event 340 into a centralized repository within the data ecosystem. Saving and retaining the data event in a centralized repository makes it immutable. An immutable objects is one whose state cannot be modified after it is created. By becoming immutable, the data event is guaranteed to never change as it is distributed, analyzed or communicated through the data ecosystem. This gives the data ecosystem a true check and balance. Upon completing the process of logging the data event 340, the pipeline service manages the execution of the data event 350 by sending it to one or more event analyzer services 360. Based on the type of data event, the one or more analyzers each generate at least one of usage or timeliness data. The event analyzer services is further described in detail as related to FIG. 4. The pipeline service may transmit the analysis results 370 to one or more of the following services: event notifier services 372, event distributor services 374 or dashboards 376. The event notifier services 372, event distributor services 374 and the dashboards 376 all serve to alert and/or report information associated with the data event, including the analysis results, to different applications or users. The event notifier services 372, event distributor services 374 a dashboards 376 are discussed in further detail as related to FIG. 4.

Figure 4:
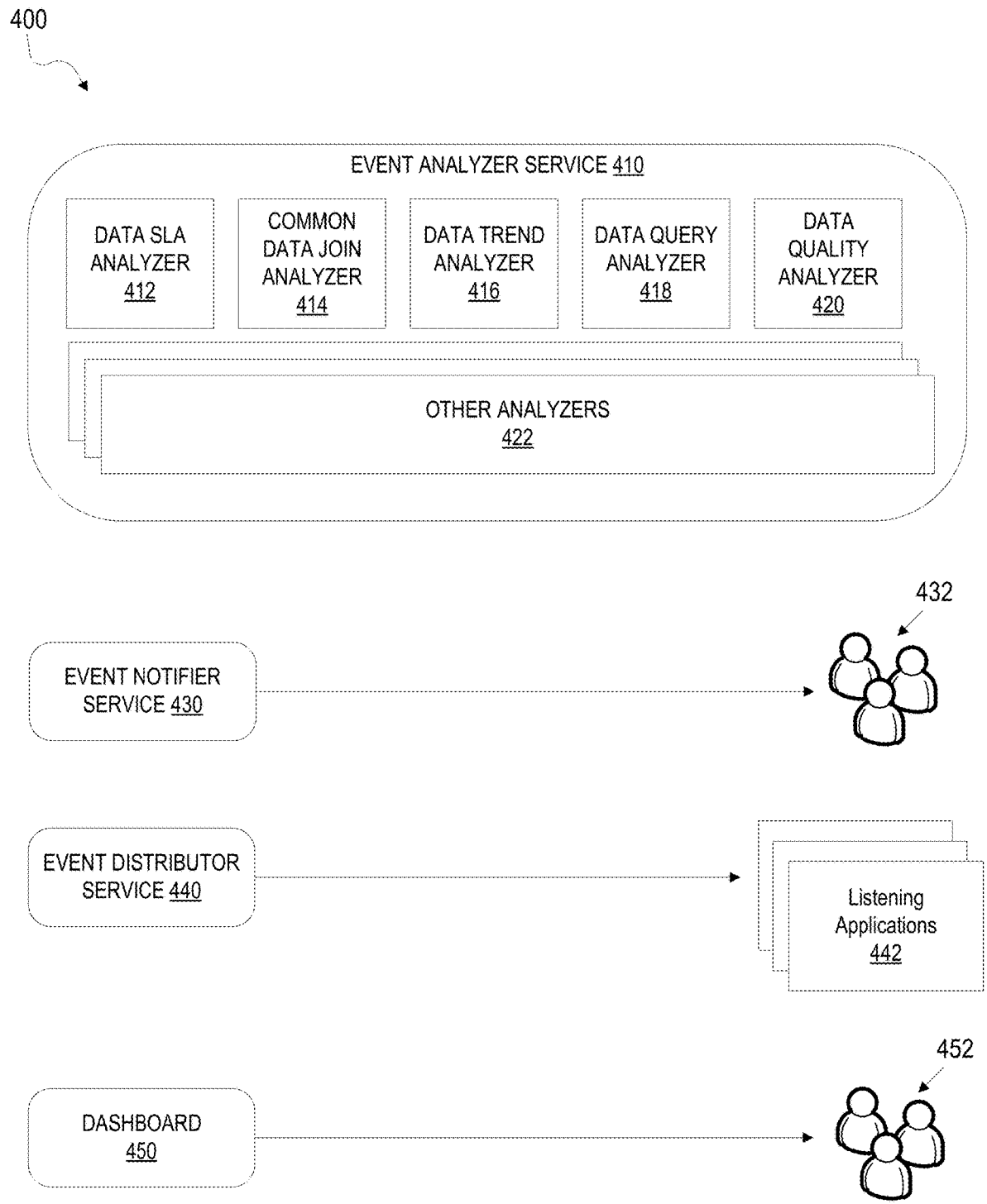
FIG. 4 illustrates example data event services useable to implement aspects of the present disclosure.

FIG. 4 illustrates example data event services 400 including an example event analyzer service 410, event notifier service 430, event distributor service 440 and dashboard 450. The data event services 400 help understand trends, inefficiencies, enable alerting and various other defined actions. The overall architecture of the data event services 400 is built leveraging open source services and software based on cloud ready micro services. This provides the ability to scale to meet business needs and adjust over time to a rapidly growing data ecosystem.

The event analyzer services 410 are a series of microservices that process events to meeting data needs which enables decoupled processing of all events within the ecosystems. Analyzer services can process any event in real-time and conduct additional analysis including, among others: data movement efficiency scoring; data read performance tuning and parsing; data SLA trend analysis and scoring; and data recommendations based on how the asset is used within the ecosystem. Some of the event analyzers include: data SLA analyzer 412, common data join analyzer 414, data trend analyzer 416, data query analyzer 418, and data quality analyzer 420. In addition to the listed types of event analyzers, a plurality of other analyzers 422 may also be included in the data event management system to analyze different performance metrics associated with the data events.

The data SLA analyzer 412 conducts analysis on if the service standards are met according to the agreed upon obligations. The data SLA analyzer 412 conducts two chains, leveraging the metadata and the direct lineage relationships to the timeliness event. For the first chain, the event end timestamp may be compared to the SLA of the direct lineage assets being loaded by the movement job. Based on the comparison, SLA may be evaluated and additional actions may be taken to provide transparency into the SLA of the assets. For the second chain, because we need to validate SLA on data that may never generate an event, the analyzer may create and maintain a live repository of expected SLA events. As events are missed or never generated, SLA processing may be conducted through this repository resulting in the same transparency into the SLA of assets.

The common data join analyzer 414 parses data read actions as well as the assets being referenced in the query resulting in a collection of joins and usage types. The common data join analyzer then analyzes data stores associated with the read action query to identify opportunities to associate data across the data ecosystem. By identifying opportunities to join data assets, the common data join analyzer helps make data event processing more efficient. The resulting analysis provided by the common data join analyzer 414 helps data owners recognize how their data is being used. It also allows data owners to understand if and what changes are required to how data is being queried in order improve the efficiency. The analysis provided by the common data join analyzer 414 helps data consumer to understand how data is being used within the data ecosystem and find new ways to associate data across the ecosystem.

The data trend analyzer 416 categorizes events into event types; builds trends based on event type patterns; and analyzes these trends. The resulting analysis helps identify, among other metrics, potential peak usage times, and inefficacies within the ecosystem. As a result of these trends data owners may be able to optimize their assets to meet the consumer demands as data changes occur. In a particular example embodiment, the data trend analyzer 416 may categorize data events into event types according to the following categorical schema.

Base Event Domain:

The base event domain contains common characteristics shared by all event models. The base domain is then extended upon to build additional event domains specific to the data ecosystems. Building event domains specific to the data ecosystems provides flexibility and scalability within the event module, while ensuring all event models remain consistent. Base event domain attributes that are shared among all categories of data events include: userID, metadata, type, description and ID. UserID is the distinct user identifier executing the movement command; metadata is a generic map for additional event metadata to be categorized; type is the event type; description provides details into the event taking place; and ID is a generic timestamp identifier generated at the time of ingestion.

Usage:

The category of data usage focuses on how data is being used, the performance of the usage, and the related objects being used. With transparency into these 3 factors, a user is able to assess the value of the data asset and effectively prioritize the user requirements/features that are needed for future maintenance of the asset. In addition, the insight into the data usage and the patterns of the usage provides data owners requirements or guidance on how to build data assets to meet the community needs. This, in turn, provides a flexible data ecosystem with the ability to shift as the data needs change and ensures that funding is being allocated to the proper deliverables.

In addition to the base event model attributes, the usage model is also defined by the timestamp, action and duration attributes. Timestamp is the timestamp of the read command being executed; action is the read command being executed and duration is the amount of time the read command takes to complete.

Timeliness:

Timeliness data events are focused on create, update or delete transactions being conducted with the data and are more typically referred to as data in movement. Timeliness tracks the statistics of the data as it flows throughout the ecosystem and provides much needed data on system performance. With the system performance information data owners, technology owners, and data consumers have the capability of identifying where bottlenecks exist within the ecosystem and if there will be delays in data availability. Timeliness data events can further be broken into two sub-categories: Movement Timeliness and Data Throughput.

Movement Timeliness:

Movement Timeliness model is typically used for batch controlled jobs that have a start and end timestamps. The movement timeliness model inherits the attributes of the base event domain, in addition to the following fields: start, end, status, metricSchema, and metric. "Start" is the timestamp that marks the start of the event moving data; "end" is the timestamp that marks the end of the event moving data; "status" is the status of the movement event (e.g. "In Progress," "Complete," "Failed"); "metricSchema" is used to define the metrics being published and the data types; and "metric" is used define the metric and the value being published Data Throughput:

Data Throughput is typically used for streaming data where there is no start or end, but a constant push of data. The data throughput model inherits the attributes of the base event domain, in addition to the following fields: timestamp, metricSchema, and metric. "Timestamp" is the timestamp that marks each push that is conducted; "metricSchema" is used to define the metrics being published and the data types; and "metric" is used define the metric and the value being published.

In addition to the two primary categories of events, usage and timeliness, other categories of data events are also created or can be pushed from within the data ecosystem to provide additional transparency into the data ledger. A subset of these additional data event categories include: SLA, quality, completeness, offset, latency and policy.

Because each event category is an extension of the base event domain, the models provide consistency throughout the lifecycle and as soon as an event is received and stored with the centralized repository it becomes immutable. This guarantees that as the event is distributed, analyzed, or communicated, it can never change and gives the data ecosystem a true check and balance with an overall indication on data availability.

With the data event domains defined, data can be pushed and processed in an immutable state throughout the data event management system architecture. The architecture guarantees that the dependent services can process data events regardless of the source platforms. The data event management system architecture is broken into five dependent service categories: ingestion services, pipeline services, analyzer services, notifier services and distributor services.

With the data event management system, organizations would be equipped to make data driven actions such as: build real-time alerting to identify bottlenecks of data movement actions with automated detection into the cause/impacts; build data assets within the data ecosystem with the flexibility to adjust to the needs of the data consumers; build automated prioritization of data consumer needs based on the commonly joined data assets; build real-time alerting and trend analysis on the read efficiency of data assets.

Once data events are categorized, the specific data events may be analyzed from one or more of the categories, and recommendations generated for purposes of improved performance. In particular, the data query analyzer 418 parses read actions and, based on the platform, analyzes the query to ensure that it adheres to a predetermined query syntax standard. The predetermined query syntax standard may be platform specific and may be defined according to published best practices for the particular platform. Data consumers may use the analysis to learn how to properly write an efficient query against data assets within the ecosystem to meet their needs. Data consumers may also use the analysis to understand the needs of their consumers and coach them on writing queries that may execute efficiently against available data repositories.

The data quality analyzer 420 is specific to timeliness events and analyzes the embedded metrics based on the schema provided and generates data quality events. This provides transparency to all users around the quality of the data being loaded to one or more of the heterogeneous data stores.

The one or more event notifier service(s) 430 are responsible for communicating all or a subset of data event actions to users 432, based on user defined preferences, via applications such as slack, email, etc. Users may include system administrators. Event notifier services 430 allow for subscriptions and real-time alerting capabilities. Regardless of the platform or action, users are able to have full transparency into the events within the ecosystem and set preferences on how events are communicated to them.

The one or more event distributor service(s) 440 allow for one or more applications 442 to listen to events as they are processed through the event chains. As data platforms build inner dependencies, they need to ensure they are listening to the same events and at the same time. The event distributor services allow for any platform to plug in the live stream of events with the ecosystem and ensure all events are processed at the same time and with the same contract.

In addition to the event analyzer services 410, event notifier services 430 and event distributor services 450, the data event management system may also include one or more dashboards 450 that provide transparency into the data ecosystem. Each dashboard may display information associated with a category of data event such as usage or timeliness to one or more users 452. A user may include a system administrator. The data event dashboards 450 are described in further detail as related to FIG. 5.

The users 432, 452 and listening applications 442 that are associated with the event notifier services 430, event distributor services 440 and dashboards 450 have the option to study the analysis reports and manually or automatically implement changes to improve how data is stored and processed within the data ecosystem. Improvements may include re-organizing the underlying data stores by joining data stores, storing data using different identifiers, or restructuring databases. By re-organizing data stores within the organization's data ecosystem, the organization may be able to improve efficiency of data assets, avoid bottlenecks, and build data assets with the flexibility to adjust to the needs of the data consumers.

Figure 5:
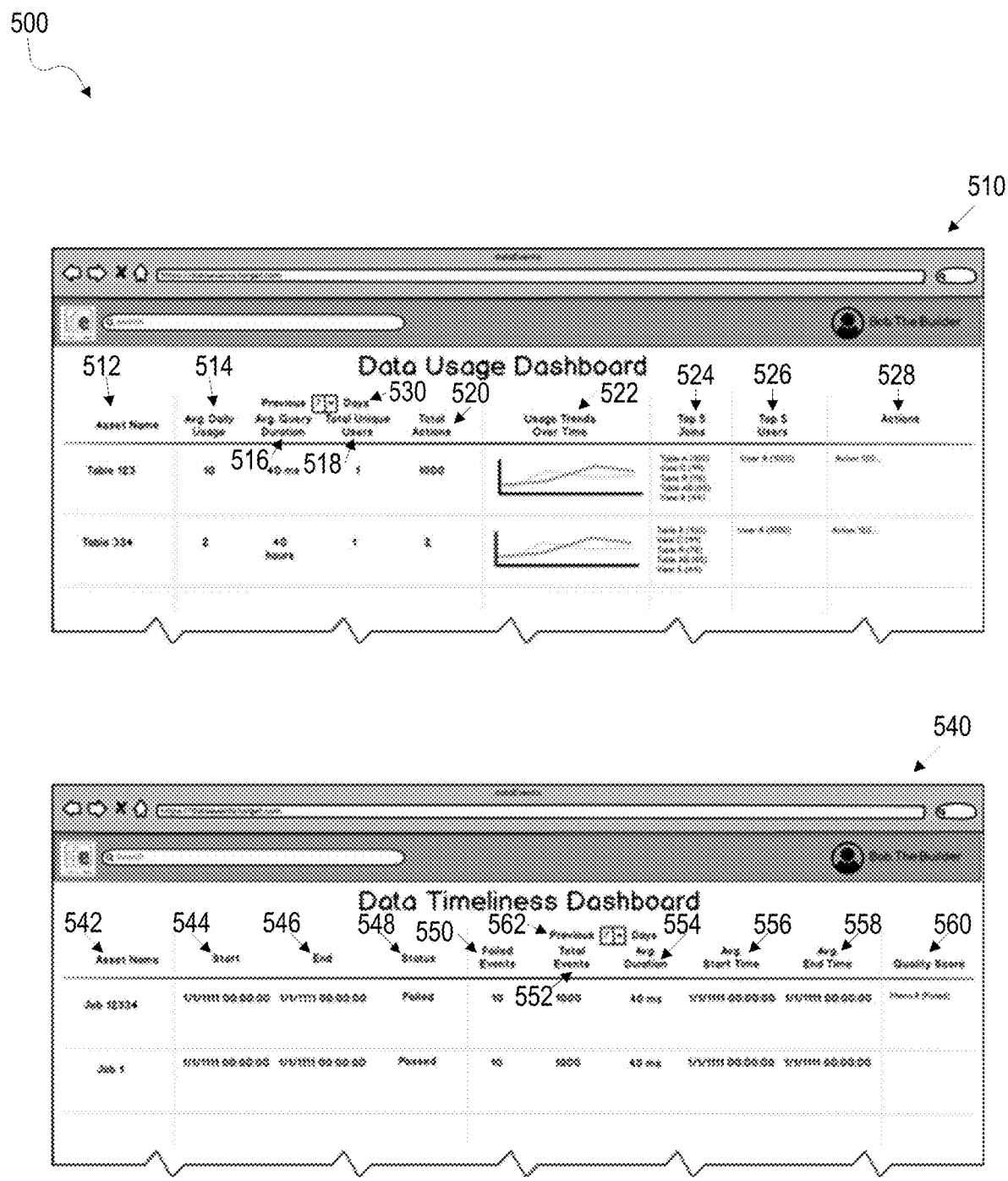
FIG. 5 illustrates example data event dashboards useable to implement aspects of the present disclosure.

FIG. 5 illustrates example data event dashboards 500. The data event management system may include one or more dashboards that depict different categories of data related to data events within the data ecosystem. The dashboard may be displayed on a monitor locally connected to the computing environment hosting the data event management system 106, or may be displayed on a user device connected to the computing environment 106 through a network. The user device may include a computer, a cell phone or any other device with a display screen that may be able to access the computing device 106 through a network 104. A subset of dashboards that may be comprised within the data event management system includes a usage dashboard 510 and a timeliness dashboard 540.

The usage dashboard 510 focuses on who is using the data and how the data is being used. The usage dashboard 510 may include one or more of the following parameters: asset name 512, average daily usage 514, average query duration 516, total unique users 518, total actions 520, usage trends over time 522, top 5 joins 524, top 5 users 526, and actions 528. The dashboard also includes a user selectable "previous number of days" 530 option that allows users to select the number of previous days over which parameters such as average daily usage 514, average query duration 516 need to aggregate data.

The asset name 512 may include the name of the particular data asset. The data asset may include a data store or database within the data ecosystem. The average daily usage 514 may include an average number of times, over the previous number of days, the data asset is affected each day. Affected may include accessed, read, edited, or deleted. The average query duration 516 may include the average duration (averaged over the previous number of days 530) it takes for a query to be completed. The total unique users 518 may include the total number of unique users that are accessing the particular data asset. The total actions 518 may include the total number of actions that may be associated with data located in the particular data. The usage trends over time 522 may include a graph of usage trends associated with the data asset with the particular asset name 512 over a predetermined time period. The top 5 joins 522 may include a list of data assets, identified by the asset name, that the particular data asset may be joined with to increase data event processing efficiency. The top 5 users 256 may include a list of most common users that are associated with accessing data within the particular data asset. The actions 528 may list one or more action, identified by an action code, that need to be executed in connection with the particular data asset.

The timeliness dashboard 540 focuses on data in movement, the efficiency in the data movement and transparency in the data in flight. The timeliness dashboard 540 may include one or more of the following parameters: asset name 542, start time 544, end time 546, status 548, failed events 550, total events 552, average duration 554, average start time 556, average end time 558 and a quality score 560. The dashboard also includes a user selectable "previous number of days" 562 option that allows users to select the number of previous days over which parameters, such as average duration 554, average start time 556 and average end time 558, need to aggregate data.

The asset name 542 may include the name of the particular data asset. The data asset may include a data store or database within the data ecosystem. The start 554 may include the start date and time of when the data event starts. The end 546 may include the end date and time of when the data event ends. The status 548 may include the status of the data event. The list of status 548 values may include: "passed" or "failed." The failed events 5510 may include the number of data event, related to the particular data asset, which have failed. The total events 552 may include the total number of data events, associated with the particular data asset, that are being currently run. The average duration 554 may include the average duration of time it takes to complete a particular data event. The average start time 556 may include the average start date and time of the data events (averaged over the previous number of days 562) that are associated with the particular data asset. The average end time 558 may include the average end date and time of the data events (averaged over the previous number of days 562) that are associated with the particular data asset. The quality score 560 may include a score associated with the quality of data associated with the particular data store as analyzed by an analyzer service.

One example of the data event management system analyzing a query and modifying the query to increase efficiency is provided herein. For example, the user may compose the following original query:

```
Select a.testA, b.testB
from ( select * from tableA ) a
AND ( select * from tableB ) b
WHERE a.date > '2019-10-05'
AND b.value > 10
AND a.test = b.test
```

In this example, the original query is written such that the entire selected table A and table B are first joined. Subsequently, assessment of the specific conditions, i.e., records that satisfy the condition: a.date>2019-10-05 AND b.value>10 AND a.test=b.test are extracted from the resultant combined data. This query is inefficient because tableA and tableB may be of significant size, so (1) joining two large tables may take significant time, and (2) assessment of conditions on the resultant joined dataset may also take significant time. In one embodiment, the data event management system may analyze the query structure and syntax and generate a modified query with a more efficient syntax to replace the user's original query. One example of the modified query includes:

```
Select a.testA, b.testB
from ( select * from tableA where date > '2019-10-05' ) a
AND ( select * from tableB where b.value > 10) b
WHERE a.test = b.test
```

In this modified query, instead of checking all records in tableA and tableB for a condition to be met, the modified query minimizes the number of records that need to be evaluated by first filtering the tables. Therefore, by only pulling records from tableA that have a.date>2019-10-05 and records from table B that have b.value>10, the number of records that are joined is reduced, and the number of joined records to be searched for the condition a.test=b.test is reduced. Thus, the modified query is more efficient, particularly in terms of computing time and resources.

In one example, modified queries may be presented as an option to the user writing the query. The user may then have the option to make the modification to the query. In another example, the modified queries may be presented to the system administrator who may then have the option of making the modification manually and/or allowing the data even management system to automatically make modification such as the one presented in all future instances.

In addition to making changes to the syntax of the query itself, the data event management system may also make changes in the underlying data structures themselves. For example, in the above example, after analysis, the data event management system may determine that table A is often filtered by a.date>2019-10-05 and table B is often filtered by b.value>10. In such a case, the data event management system may in one example, present the user or system administrator with the option of creating new data structures that only include the subset of records related to a.date>2019-10-05 and b.value>10. Still further, the data event management system may determine that data from tableA and tableB are often joined in queries; as such, the system may recommend storing those tables in a common data structure (e.g., a same database or table, if those tables were not previously included in the same database or table). Creating data structures with only the subset of information, or pre-computed joins, increases efficiency of the query by not having to perform the joining and/or filtering steps repeatedly or on large datasets. In example embodiments, the suggestions to present modified queries may be presented to a user of a data portal against which queries are submitted, while the suggestions to modify underlying data structures may also be generated based on the same queries, but may be provided to a system administrator either on a realtime or other basis (e.g., in periodic or on-demand reports regarding detected proposed data structure improvements that may be delivered to such a data administrator).

Figure 6:
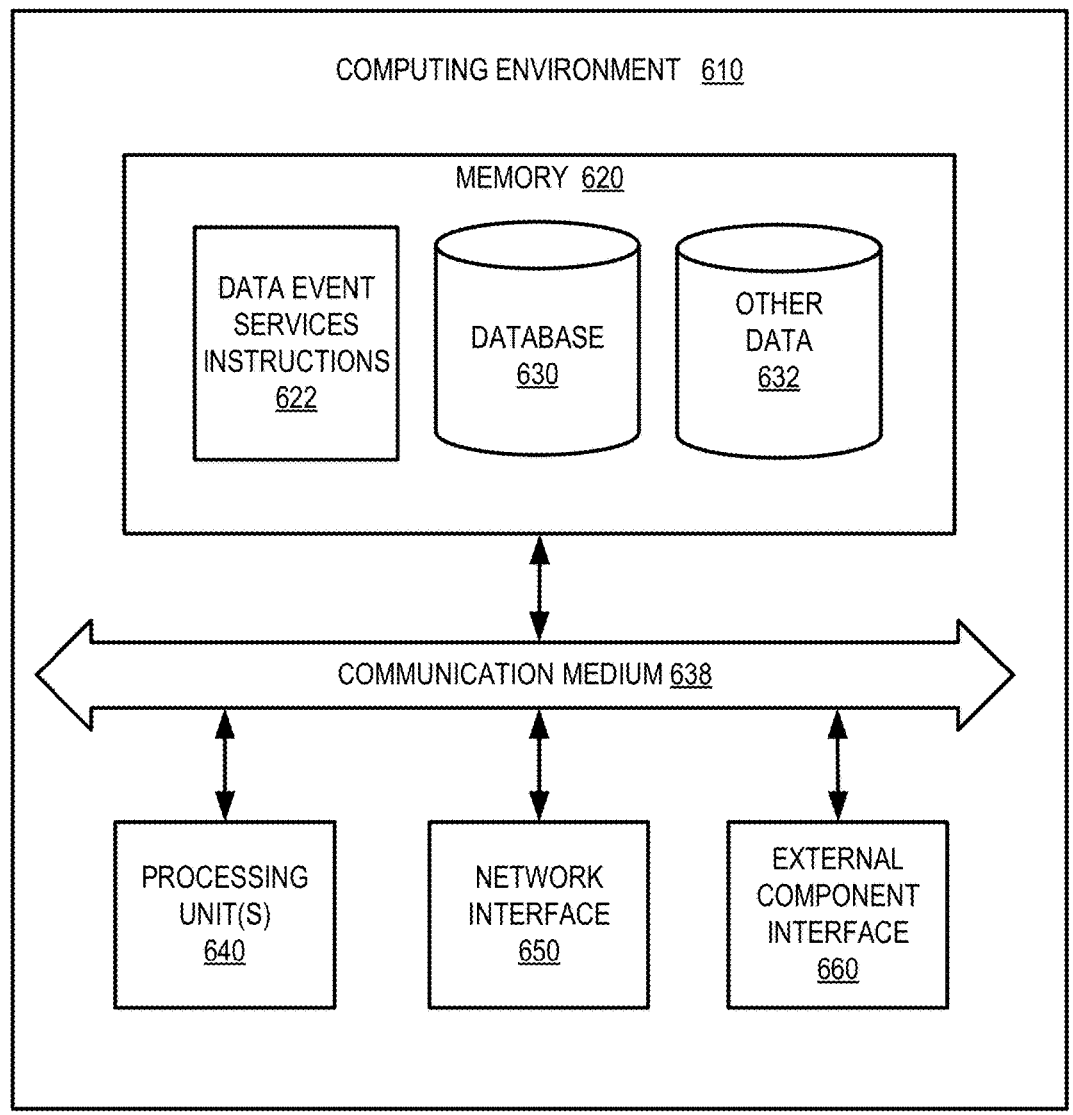
FIG. 6 illustrates an example system with which disclosed systems and methods can be used.

FIG. 6 illustrates an example system 600 with which disclosed systems and methods can be used. In an example, the user device 102, computing environment 106, and data source 112 can be implemented as one or more systems 600 or one or more systems having one or more components of systems 600. In an example, the system 600 can include a computing environment 610. The computing environment 610 can be a physical computing environment, a virtualized computing environment, or a combination thereof. The computing environment 610 can include memory 620, a communication medium 638, one or more processing units 640, a network interface 650, and an external component interface 660.

The memory 620 can include a computer readable storage medium. The computer storage medium can be a device or article of manufacture that stores data and/or computer-executable instructions. The memory 620 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 620 can store various types of data and software. For example, as illustrated, the memory 620 includes data event services instructions 622 for implementing one or more aspects of the data event management system described herein (e.g., as described in relation to FIGS. 1-4), database 630, as well as other data 632. In some examples (e.g., where the computing environment 610 is a user device 102), the memory 620 can include instructions for accessing a data event management system. In some examples (e.g., where the computing environment 610 is a data source 114), the memory 620 can include instructions for acting as a data source.

The communication medium 638 can facilitate communication among the components of the computing environment 610. In an example, the communication medium 638 can facilitate communication among the memory 620, the one or more processing units 640, the network interface 650, and the external component interface 660. The communications medium 638 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 640 can include physical or virtual units that selectively execute software instructions. In an example, the one or more processing units 640 can be physical products comprising one or more integrated circuits. The one or more processing units 640 can be implemented as one or more processing cores. In another example, one or more processing units 640 are implemented as one or more separate microprocessors. In yet another example embodiment, the one or more processing units 640 can include an application-specific integrated circuit (ASIC) that provides specific functionality. In yet another example, the one or more processing units 640 provide specific functionality by using an ASIC and by executing computer-executable instructions.

The network interface 650 enables the computing environment 610 to send and receive data from a communication network (e.g., network 140). The network interface 650 can be implemented as an Ethernet interface, a token-ring network interface, a fiber optic network interface, a wireless network interface (e.g., WI-FI), or another type of network interface.

The external component interface 660 enables the computing environment 610 to communicate with external devices. For example, the external component interface 660 can be a USB interface, Thunderbolt interface, a Lightning interface, a serial port interface, a parallel port interface, a PS/2 interface, and/or another type of interface that enables the computing environment 610 to communicate with external devices. In various embodiments, the external component interface 660 enables the computing environment 610 to communicate with various external components, such as external storage devices, input devices, speakers, modems, media player docks, other computing devices, scanners, digital cameras, and fingerprint readers.

Although illustrated as being components of a single computing environment 610, the components of the computing environment 610 can be spread across multiple computing environments 610. For example, one or more of instructions or data stored on the memory 620 may be stored partially or entirely in a separate computing environment 610 that is accessed over a network.

This disclosure described some aspects of the present technology with reference to the accompanying drawings, in which only some of the possible aspects were shown. Other aspects e aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
    receiving a data event at a data portal,
        wherein the data event is an event associated with data that is located in one or more data stores from among a plurality of heterogeneous data stores of a data ecosystem; and
        wherein the data portal is a user application accessible interface with which users can interact to access the heterogeneous data stores, and to access information about the heterogeneous data stores without accessing underlying data of the heterogeneous data stores;
    processing the data event at the data portal;
    ingesting the data event into a pipeline service for additional processing;
    logging the data event via the pipeline service in a data event log;
    managing execution, via the pipeline service, of a plurality of analyses associated with the data event, the plurality of analyses each generating at least one of usage or timeliness data for the data event, wherein the timeliness data includes tracking time related statistics as the data flows through the data ecosystem; and
    transmitting a result of the analyses to at least one application external to the data portal, the result including a trend analysis of data events and a recommendation regarding restructuring of a query syntax to comply with a predetermined query syntax standard and wherein transmitting includes, at one or more event distributors, enabling one or more applications to listen to the data event processed at the data portal during the processing.

2. The method of claim 1, wherein processing the data event comprises:
    issuing data access requests from the data portal to the one or more data stores; and
    handling returned data from the one or more data stores in response to the data access requests by a user application.

3. The method of claim 1, wherein the plurality of analyses includes:
    a data service level agreement analysis that comprises:
        comparing an end timestamp of the data event to service level agreement (SLA) of direct lineage assets; and
        based on the comparison, taking one or more additional actions that provide transparency into SLA of data assets.

4. The method of claim 1, wherein the plurality of analyses includes:
    a common data join analysis that comprises:
        parsing a read action query; and
        analyzing data stores associated with the read action query to identify opportunities to associate data across the data ecosystem.

5. The method of claim 1, wherein the plurality of analyses include:
    a data trend analysis that comprises:
        categorizing received data events into data event types;
        building trends based on the data event types; and
        analyzing the trends to identify inefficiencies within the data ecosystem.

6. The method of claim 1, wherein the plurality of analyses include:
    a data quality analysis that comprises:
        analyzing timeliness metrics associated with the data events in order to determine the quality of the data being loaded to the plurality of heterogeneous data stores.

7. The method of claim 1, wherein transmitting includes notifying users using subscriptions or real-time alerting.

8. The method of claim 1, wherein transmitting includes displaying the result of the analyses on at least one dashboard focused on (a) usage of data; or (b) data in movement.

9. The method of claim 1, wherein the result further includes a recommendation regarding restructuring of one of the heterogeneous data stores.

10. A system comprising:
    a data portal that receives a data event;
        wherein the data event is an event associated with data that is located in one or more data stores from among a plurality of heterogeneous data stores of an enterprise; and
        wherein the data portal is user application accessible interface with which users can interact to access the heterogeneous data stores, and to access information about the heterogeneous data stores without accessing underlying data of the heterogeneous data stores;
    an event pipeline service that conducts additional processing on the data event, wherein the additional processing includes:
        logging the data event via a pipeline service in a data event log;

managing execution, via the pipeline service, of a plurality of analyses associated with the data event, the plurality of analyses each generating at least one of usage or timeliness data for the data event, wherein the timeliness data includes tracking time related statistics as the data flows through the data enterprise; and transmitting a result of the analyses to at least one application external to the data portal, the result including a trend analysis of data events and a recommendation regarding restructuring of a query syntax to comply with a predetermined query syntax standard and wherein transmitting includes, at one or more event distributors, enabling using one or more applications to listen to the data event processed at the data portal during the processing;

an event ingest service that ingests the data event into the event pipeline service for the additional processing.

11. The system of claim 10, wherein the plurality of analyses includes:
a data service level agreement analysis that comprises:
comparing an end timestamp of the data event to service level agreement (SLA) of direct lineage assets; and
based on the comparison, taking one or more additional actions that provide transparency into SLA of data assets.

12. The system of claim 10, wherein the plurality of analyses includes:
a common data join analysis that comprises:
parsing a read action query; and
analyzing data stores associated with the read action query to identify opportunities to associate data across the data ecosystem.

13. The system of claim 10, wherein the plurality of analyses includes:
a data trend analysis that comprises:
categorizing received data events into data event types;
building trends based on the data event types; and
analyzing the trends to identify inefficiencies within the data ecosystem.

14. The system of claim 10, where in the plurality of analyses includes:
a data quality analysis that comprises:
analyzing timeliness metrics associated with the data events in order to determine the quality of the data being loaded to the plurality of heterogeneous data stores.

15. The system of claim 10, wherein transmitting includes using one or more notifiers to notify users using subscriptions or real-time alerting.

16. The system of claim 10, wherein transmitting includes displaying the result of the analyses on at least one dashboard focused on (a) usage of data; or (b) data in movement.

17. A method comprising:
receiving a data event associated with a read action query at a data portal,
wherein the data event is an event associated with data that is located in one or more data stores from among a plurality of heterogeneous data stores of a data ecosystem; and
wherein the data portal is a user application accessible interface with which users can interact to access the heterogeneous data stores, and to access information about the heterogeneous data stores without accessing underlying data of the heterogeneous data stores;

processing the data event at the data portal;
ingesting the data event into a pipeline service for additional processing;
logging the data event via a pipeline service in a data event log;
managing execution, via the pipeline service, of a plurality of analyses associated with the data event, wherein:
the plurality of analyses are each implemented using an independent micro-services architecture; and
the plurality of analyses includes:
generation of at least one of usage or timeliness data for the data event, wherein the timeliness data includes tracking time related statistics as the data flows through the data ecosystem; and
a common data join analysis that comprises:
parsing the read action query;
analyzing data stores associated with the read action query for usage data; and
based on the analysis, generating a recommendation to restructure the read action query syntax to comply with a predetermined query syntax standard and join one or more data sets distributed across one or more data stores to improve performance of the read action query; and
transmitting the recommendation to at least one application external to the data portal, wherein transmitting includes, at one or more event distributors, enabling one or more applications to listen to the data event processed at the data portal during the processing.

\* \* \* \* \*